United States Patent [19]

Roger et al.

[11] 4,063,491

[45] Dec. 20, 1977

[54] DEVICE FOR DISCONTINUING AND AUTOMATICALLY RESTORING THE OPERATIONAL FUNCTION OF A SPRING BRAKE ACTUATOR

[75] Inventors: Michel Roger, Ville d'Avray, France; Nils Borje Lennart Sander; Bo Ivar Jonny Brundin, both of Malmo, Sweden

[73] Assignee: Svenska Aktiebolaget Bromsregulator, Malmo, Sweden

[21] Appl. No.: 662,272

[22] Filed: Feb. 27, 1976

[30] Foreign Application Priority Data

Mar. 3, 1975 Sweden .............................. 7502325

[51] Int. Cl.² .............................. F01B 7/00; F16J 1/10
[52] U.S. Cl. .................................. 92/130 A; 92/63; 92/116

[58] Field of Search ................ 92/63, 130 A, 116, 29

[56] References Cited

U.S. PATENT DOCUMENTS

| 3,182,566 | 5/1965 | Berg et al. ............... 92/63 |
| 3,187,642 | 6/1965 | Cruse ....................... 92/63 |
| 3,485,537 | 12/1969 | Schlor et al. ............. 92/63 |
| 3,994,205 | 11/1976 | Ekdahl et al. ............ 92/29 |

*Primary Examiner*—Paul E. Maslousky
*Attorney, Agent, or Firm*—Laurence R. Brown

[57] ABSTRACT

A spring brake actuator has manual means for discontinuing and automatic means for restoring the spring braking function. A non-self-locking nut member is rotatable about the spindle and is releasably locked to the brake cylinder in that direction it rotates due to spring force.

5 Claims, 5 Drawing Figures

DEVICE FOR DISCONTINUING AND AUTOMATICALLY RESTORING THE OPERATIONAL FUNCTION OF A SPRING BRAKE ACTUATOR

BACKGROUND OF THE INVENTION

This invention relates to a device for discontinuing and automatically restoring the operational function of a spring brake actuator, comprising a cylinder, a piston, a spring actuating the piston in a working direction for brake application at falling fluid pressure at the opposite side of the piston, a non-rotatable piston rod, and in the force transmitting path between the piston and the piston rod two means coaxial with the piston rod and in non-self-locking thread engagement with each other, of which means one is rotatably journalled and the other at least at the spring force transmission is non-rotatable.

Devices for discontinuing and automatically restoring the operational function of a spring brake actuator are needed for the case that no fluid pressure is available for compressing the spring and thus for releasing the brakes and that the vehicle on which the actuator is mounted must be moved. Thus the force transmitting path in the actuator from the spring to the piston rod may be broken from the outside but must be restored automatically at the return of fluid pressure for compressing the spring.

A device of the kind referred to above is shown in Swedish Pat. Specification No. 7314472-7 U.S. Ser. No. 639,407 filed Dec. 10, 1975 now U.S. Pat. No. 3,994,206 which is a continuation of U.S. Ser. No. 514,929 filed Oct. 15, 1974, now abandoned. This device comprises a rotatable nut in non-self-locking engagement with a threaded spindle or piston rod. There is a releasable one-way clutch between the piston and the nut. Two embodiments are shown, both with certain drawbacks. In the first embodiment there is a control means for the clutch following the piston movements and extending out of the actuator. This solution gives rise to sealing problems and may even in certain cases be less reliable. In the second embodiment the whole spring force is transmitted via the clutch, which means that a great manual force is needed for releasing the clutch.

OBJECTS

The object of the present invention is thus to remove the drawbacks with the earlier known solutions and to attain a reliable but still cheap and simple device of the kind referred to above.

BRIEF DESCRIPTION

This is according to the invention attained in that the rotatable means is releasably locked to the cylinder in its spring force transmitting rotational direction.

Other features of the invention appear from the appended claims and the following description. It may, however, be stressed that two somewhat different solutions are possible within the scope of the invention. In a first case a rotatable nut in non-self-locking thread engagement with a non-rotatable spindle is connected to the releasable lock. In a second case a rotatable spindle in non-self-locking thread engagement with a nut non-rotatable at least at the spring force transmission is connected to the releasable lock. The necessary one-way clutch may be provided in the lock itself or somewhere else in the device.

THE DRAWINGS

The invention will be described in further detail below, reference being made to the accompanying drawings, in which FIGS. 1–5 are partly sectional side views of five different embodiments of a spring brake actuator according to the invention.

As appears the different embodiments are similar to each other. Therefore, same numerals have been used for same parts in the drawings.

DETAILED DESCRIPTION

Figure 1:
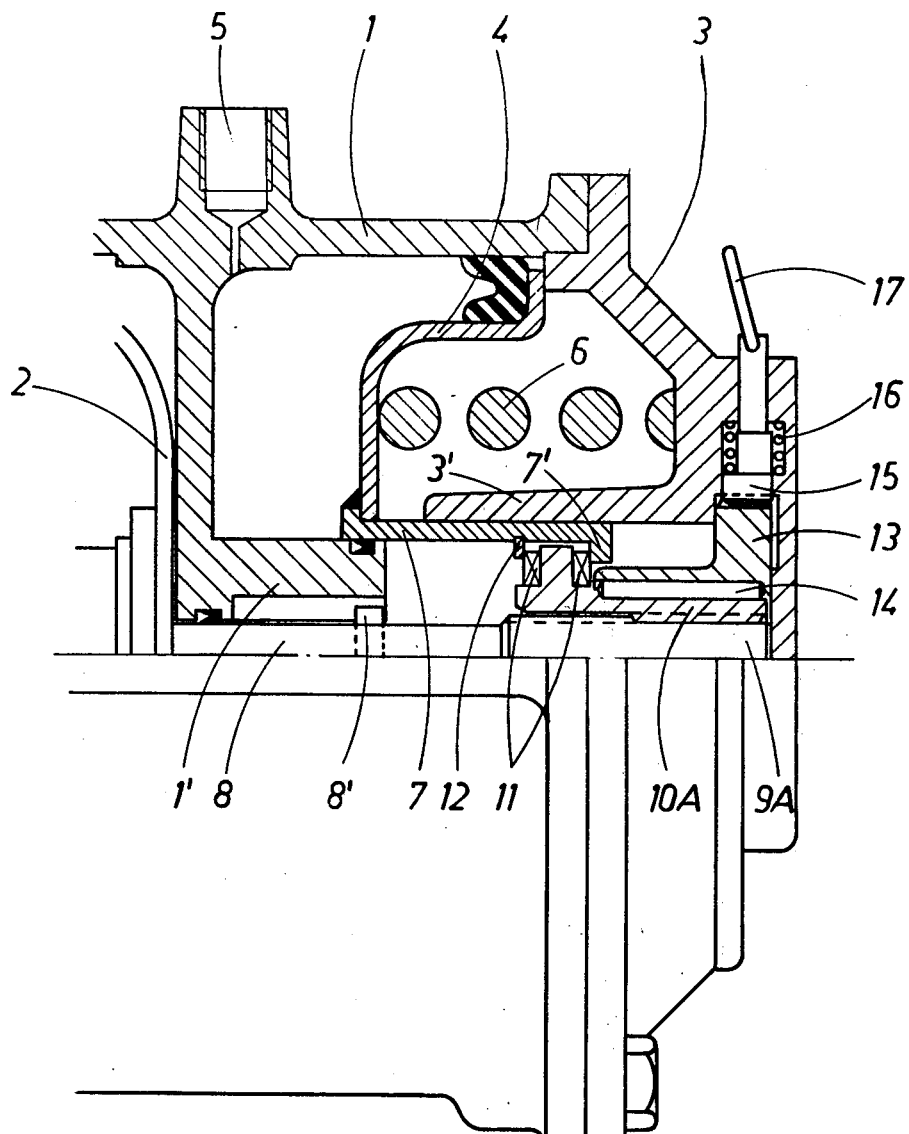

Referring first to FIG. 1, a spring brake cylinder 1 is designed in one piece with a service brake actuator, which is to be mounted on a suitable part of a vehicle underframe and whose piston bears the numeral 2. The cylinder 1 may quite as well be attached to the service brake actuator. A cylinder cover 3 is attached to the cylinder 1. A piston provided with an ordinary sealing is axially movable in the cylinder 1 under the action of on the one side a fluid pressure admitted through a fluid pressure inlet 5, on the other side a working spring 6 bearing against the cylinder cover 3. A piston sleeve 7 is fixed to the piston 4 and is axially guided by a cylinder sleeve 1' and a cylinder cover tube 3'. In the shown position the fluid pressure is sufficient to counteract the force of the spring 6, which thus is held compressed and inactive. When the spring 6 is allowed to expand at a diminishing fluid pressure the piston 4 will move to the left in the drawing. A piston rod 8 is guided for axial movements by the cylinder sleeve 1' and co-operates with the service brake piston 2. The piston rod 8 is prevented from rotating by the engagement between a piston rod boss 8' and an axial groove in the cylinder sleeve 1'. A threaded spindle 9A is fixed to (or rather formed in one piece with) the piston rod 8. A nut 10A is in non-self-locking engagement with the spindle 9A. As shown, the nut 10A is rotationally journalled in relation to the piston sleeve 7 by means of thrust bearings 11 arranged between on the one side of the nut 10A, on the other side a piston sleeve flange 7' and a circlip 12 respectively.

A circular control member 13 partly surrounding the nut 10A is connected thereto by means of one or more needles 14 in axial grooves in the ring 13 and the nut 10A, so that only a relative axial displacement between these two parts will be permitted. The control member 13 is as shown axially immovably arranged in the cylinder cover 3. It is provided with ratchet teeth on its periphery, co-operating with corresponding teeth on a plunger 15 arranged in the cylinder cover 3 and biassed into engagement with the control member ratchet teeth by means of a spring 16. A pull ring 17 is arranged at the end of the plunger 15 extending out of the cylinder cover 3.

The operation of described device is as follows:

When the spring 6 starts to expand due to falling fluid pressure the piston 4 with its piston sleeve 7 will move to the left in the drawing. The force from the spring 6 will be transmitted from the piston sleeve 7 via its flange 7', the right hand bearing 11, the nut 10A, the spindle 9A and the piston rod 8 to the service brake piston 2 and further to a brake rigging of any type (not shown), provided that the nut 10A is prevented from rotating at the force transmission. By properly choosing the thread direction of the spindle 9A and the nut 10A and the locking direction of the ratchet clutch comprising the control member ratchet teeth and the plunger 15 this will be the case as long as the plunger 15 is held in engagement with the control member 13 by the spring 16. At the return of fluid pressure for compressing the spring 6 the different parts will return to their shown positions, and in this case the force is transmitted from the piston sleeve 7 to the assembly comprising the nut 10A, the spindle 9A, and the piston rod 8 via the circlip 12 and the left hand bearing 11.

If it is desired to relieve the service brake piston 2 from the spring force and no fluid pressure is available for normal return movement as described, it is only necessary to pull the pull ring 17. Now the control member 13 and thus the nut 10A will be free to rotate relative to the spindle 9A, so that the piston 4 may move to its extreme left position under the action of the spring 6 and the spindle 9A with the piston rod 8 may move to its shown extreme right position under the action of a return spring (not shown) in the brake rigging with the consequence that the brakes will be released and that the vehicle on which the arrangement is mounted may be moved despite the lack of fluid pressure for compressing the spring 6.

At the return of fluid pressure for compressing the spring 6 the different parts will automatically return to their shown positions, as in this case the control member 13 (and thus the nut 9A) is free to rotate despite the fact that the plunger 15 is held in engagement with the control member 13 by the spring 16. This is due to the non-locking engagement between these parts in this rotational direction. When the parts have reached the shown positions, the spring brake actuator is ready for a new normal operation as described above.

Figure 2:
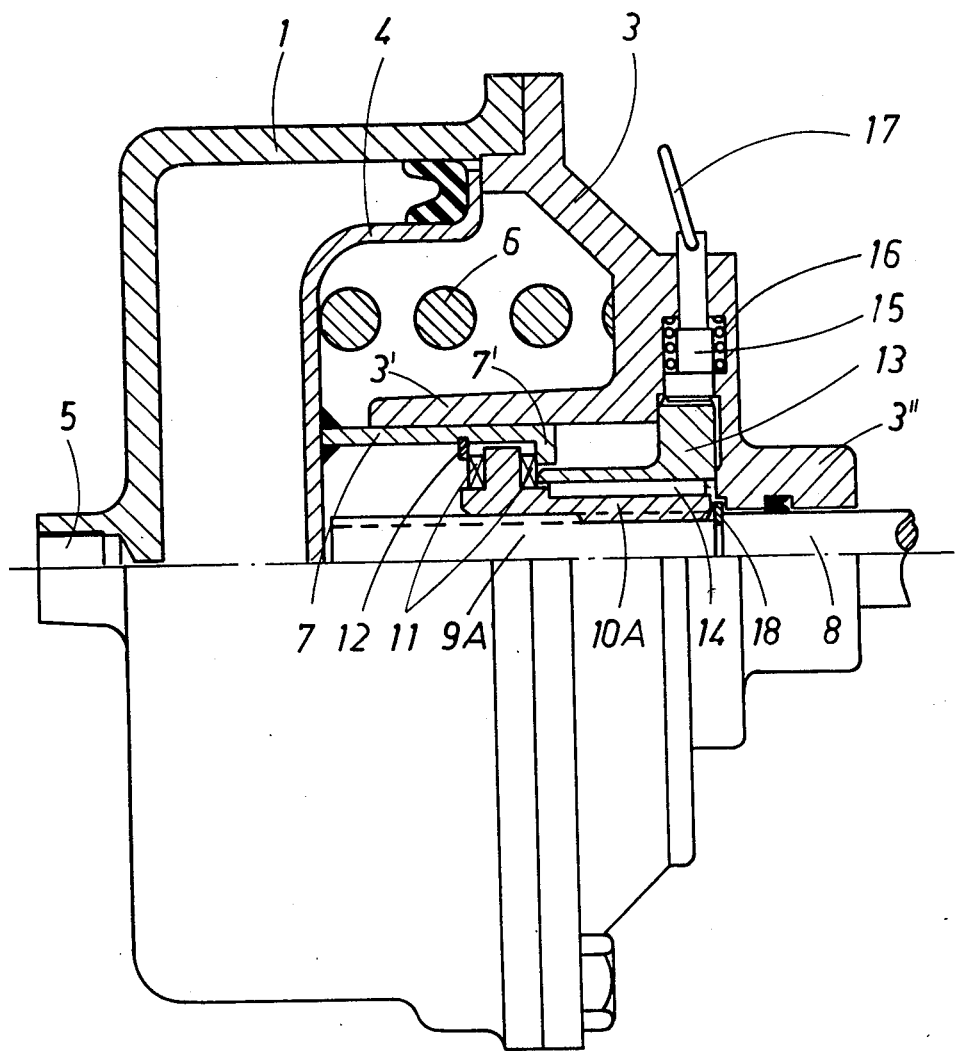

The embodiment according to FIG. 2 is only slightly modified in comparison with the described one. The main difference is that the embodiment according to FIG. 2 is a spring brake actuator not connected to a service brake actuator and having a pulling piston rod 8, guided by a cylinder cover sleeve 3" and held against rotation in a way not shown. The only added element in this embodiment is a circlip 18 on the piston rod 8 at the cylinder cover sleeve 3" in the shown position of the different parts. This circlip 18 will act as a stop for the piston rod 8 at the return of fluid pressure after a manual release by means of the pull ring 17.

The operation of the embodiment according to FIG. 2 is the same as that of the former one. As already said, the only diffference is that the working force is a pulling force.

This actuator may for example be used as a parking brake actuator together with a separate service brake actuator in an application with very limited space at the latter preventing the use of an arrangement substantially as shown in FIG. 1 or the like.

Figure 4:
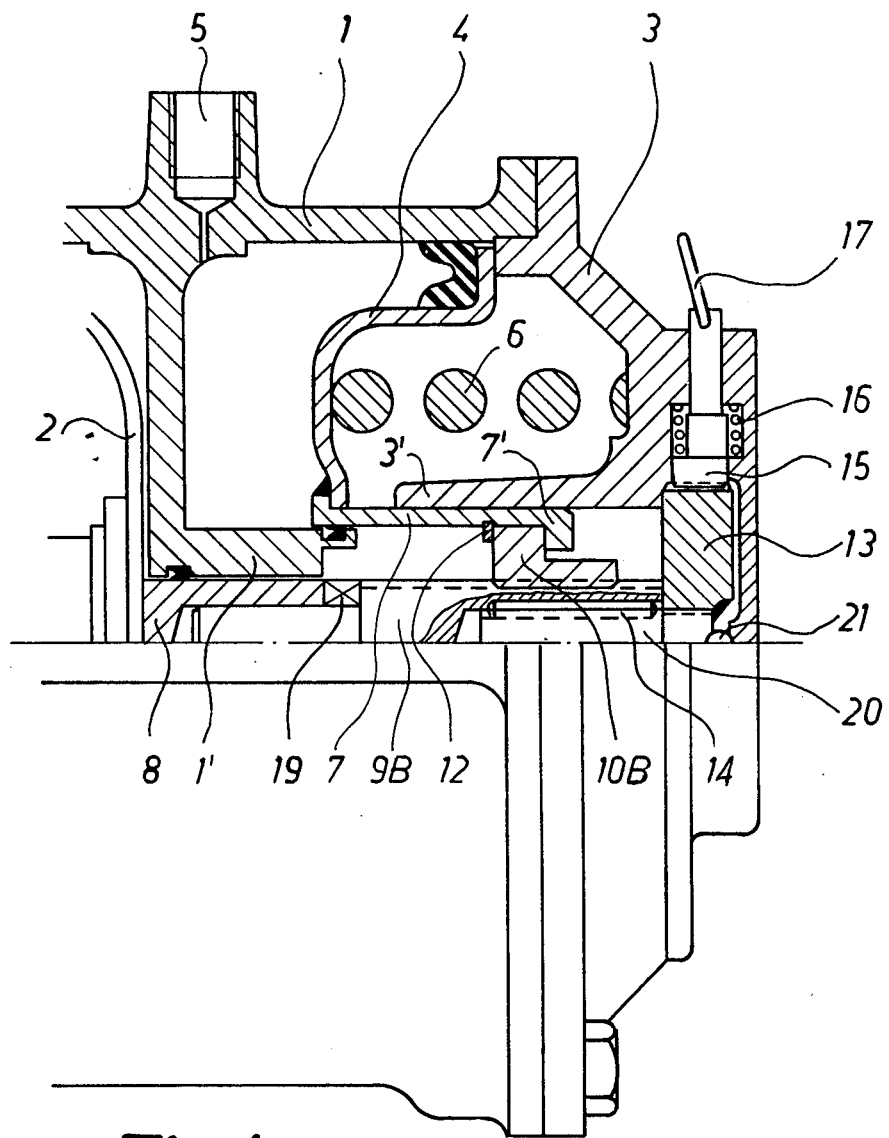
Figure 5:
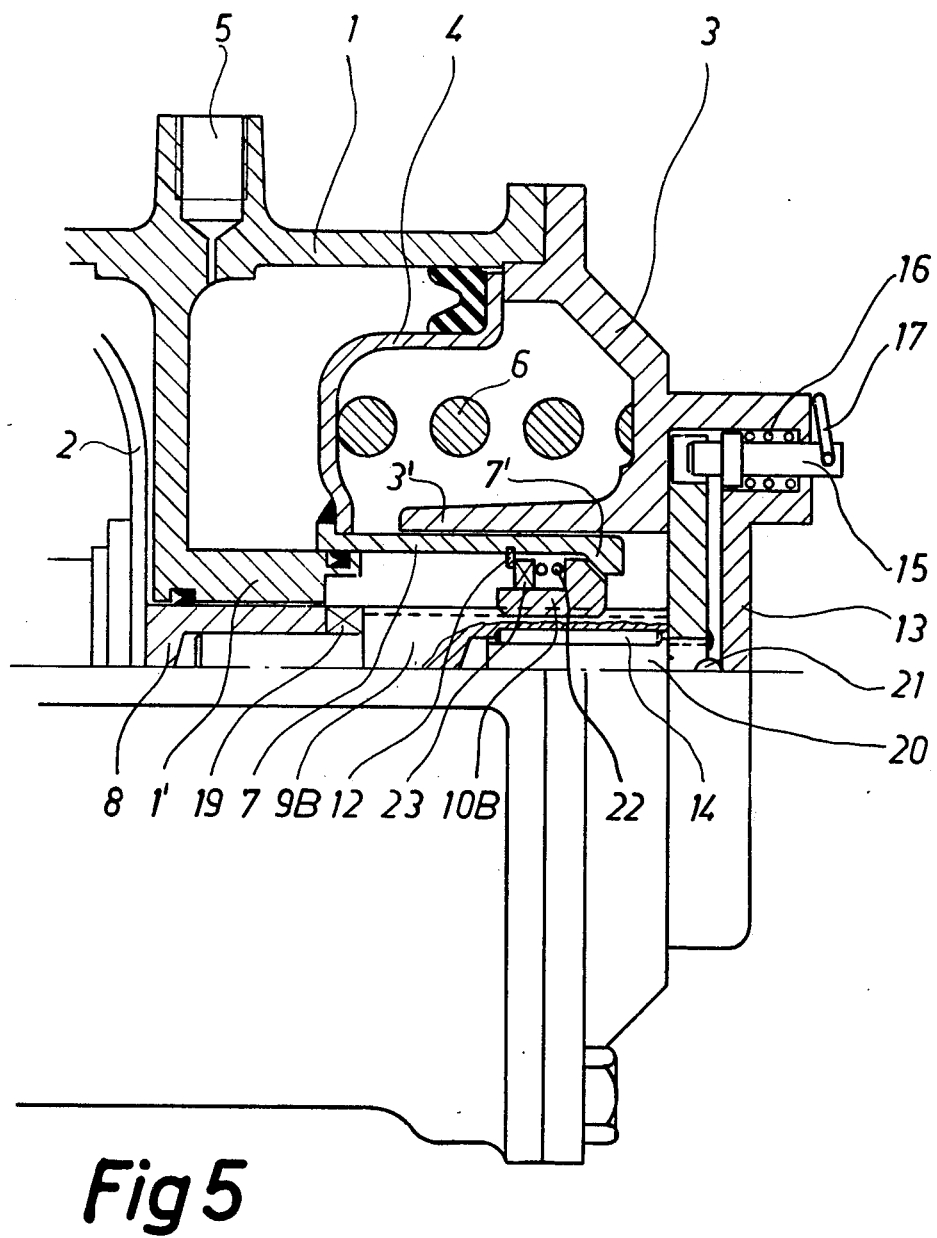

In the two embodiments according to FIGS. 1 and 2 the spindle is held against rotation, whereas the nut in thread engagement therewith is rotationally journalled. However, the opposite situation is also possible, and three examples of arrangements with a rotationally journalled spindle and a nut held against rotation at least at force transmission are shown in FIGS. 3–5.

Figure 3:
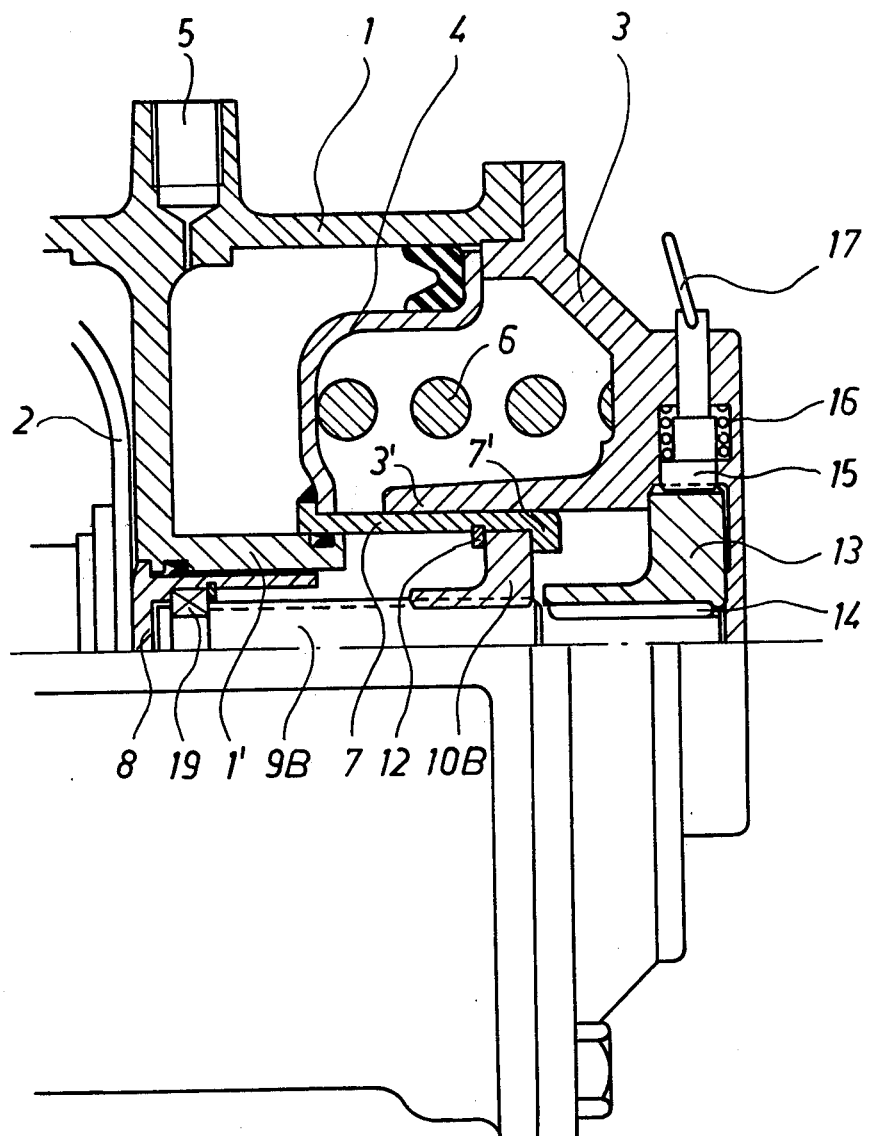

Most of the elements described above with reference to FIGS. 1 and 2 may also be found in the embodiment according to FIG. 3. A cylinder 1 with a fluid pressure inlet 5 has a cylinder cover 3 and a piston 4, a spring 6 being arranged between the two latter elements. A piston rod 8 axially guided by a cylin cylinder sleeve 1' coacts with a service brake piston 2. A piston sleeve 7 guided by a cylinder cover tube 3' is provided with a flange 7' and a circlip 12. A control member 13 rotationally arranged in the cylinder cover 3 cooperates with a plunger 15 provided with a pull ring 17 and biassed against the ratchet toothed periphery of the control member 13 by means of a spring 16.

Turning now to the differences it may be observed that a spindle 9B coacts with the piston rod 8 but is rotationally journalled relative the latter by means of a thrust bearing 19 and that a nut 10B in non-self-locking engagement therewith is non-rotatably clamped between the piston sleeve flange 7' and the circlip 12. One or more needles 14 are arranged between the spindle 9B and the control member 13, so that relative rotation between these two parts is prevented.

The operation of this embodiment according to FIG. 3 is mainly the same as that of the FIG. 1 embodiment. Under normal conditions the spindle 9B will be prevented from rotating by the control member 13, and the force transmitting path will be: the spring 6, the piston 4, the piston sleeve 7, the flange 7', the nut 10B, the spindle 9B, the bearing 19, the piston rod 8, and the service brake piston 2, or the opposite at the return movement. At a release by means of the pull ring 17 the nut 10B will be free to move forward in the brake applying direction under the influence of the spring 6 due to the rotation of the spindle 9B. At the return of the fluid pressure the parts will automatically return to their shown positions ready for a new normal operation.

The only real difference between the embodiments according to FIGS. 3 and 4 is the co-operation between the rotationally journalled spindle 9B and the control member 13. The former is provided with an axial recess, whereas a pin 20 extending into this recess is attached to the control member 13. The needles 14 are arranged in the recess between the spindle 9B and the pin 20. A ball 21 constitutes a bearing for the pin 20 and the control member 13.

As appears at a comparison between FIGS. 4 and 5 there are two places in the design with differencies: the co-operation between the nut 10B and the piston sleeve 7 and between the controlmmember 13 and the plunger 15.

In this case the nut 10B is held against the piston sleeve flange 7' by means of a spring 22 between the nut 10B and a thrust bearing 23 supported by the circlip 12. The cooperating surfaces of the nut and the flange are preferably toothed, so that a dog clutch is formed.

Further, the plunger 15 is placed in the axial direction of the actuator and co-operates with closely spaced recesses in the periphery of the control member 13.

In the four earlier described embodiments a one-way clutch is formed between the ratchet teeth of the control member 13 and the plunger 15. In the present case, however, there is no such one-way clutch. Therefore, a relative displacement between the piston sleeve 7 and the spindle 9B must be permitted in another way at the return of fluid pressure after a manual release. It may thus be observed that under normal conditions the nut 10B will be held against the piston sleeve flange 7' and may be regarded as a fixed element. Only at the return of fluid pressure after a manual release the dog clutch formed between the nut 10B and the flange 7' will be opened under the influence of the fluid pressure force, so that the nut 10B may rotate and reassume its shown position ready for a new operation.

Modifications are possible within the scope of the appended claims. For example, it may be noted that the axially movable connection between the control member 13 and the rotatable means (the nut 10A or the spindle 9B) can have another form than the needles 14. Further, the releasable rotational lock of the control member 13 to the cylinder cover 3 may have another practical solution. A mechanical releasing movement may be transferred to the plunger 15 in another way than by the pull ring 17, for example by means of an excenter or the like. The plunger 15 may further be controlled by fluid pressure. Other practical changes are also possible.

What is claimed is:

1. A spring brake actuator for a brake system having a spring holding a braking piston in a braking position, comprising in combination, a cylinder, a piston rod movable to actuate said braking piston in braking and release directions, a fluid responsive piston movable in said cylinder in one direction for overcoming said spring by fluid pressure to release the braking piston, said spring actuating the piston in an opposite direction for braking at falling of said fluid pressure, a non-rotatable threaded member movable with the piston rod, means including a first rotatable member coaxial with the piston coupling the piston rod to the piston for movement by said piston, a second rotatable member coaxial with the piston rod connected for simultaneous rotation with said first member, said first rotatable member in non-self locking thread engagement with said non-rotatable member, manually releasable lock means locking to the cylinder the second one of said rotatable members in its direction of rotation by said thread engagement caused by the spring when actuating the braking piston in the braking direction wherein the second rotatable member is connected to the first rotatable member in a way only allowing relative axial movements therebetween and means holding one of said rotatable members axially immovably arranged in the cylinder, said lock means comprising a plunger mounted in the cylinder and spring-biassed means holding the plunger into engagement with the second rotatable member.

2. A device according to claim 1, characterised in that the second rotatable member periphery is provided with ratchet teeth for allowing relative rotational movements with the plunger in one direction.

3. A device according to claim 1, characterised in that the second rotatable member periphery is provided with recesses engaging the plunger and in that a separate one-way clutch device is arranged to permit rotation of said rotatable members in one direction.

4. A device according to claim 1, characterised in that the first and second rotatable members each have axial grooves, and a connection therebetween is effected by means of at least one keyed in said axial grooves of the two rotatable means.

5. A device according to claim 1, characterised in that the lock means comprises a plunger provided with a pull ring extending out of the cylinder.

* * * * *